Patented Aug. 30, 1932

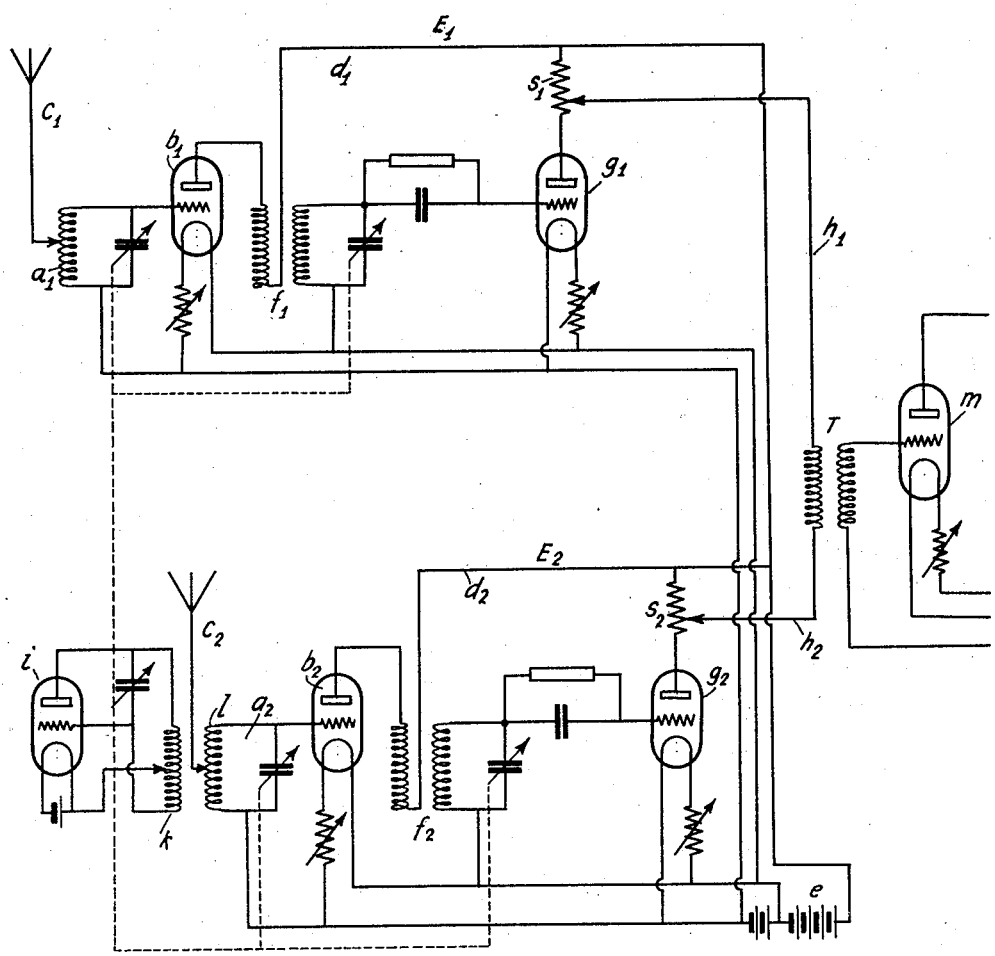

1,874,910

UNITED STATES PATENT OFFICE

FRIEDRICH CONRAD, OF BERLIN, GERMANY, ASSIGNOR TO SIEMENS & HALSKE, AKTIENGESELLSCHAFT, OF SIEMENSSTADT, NEAR BERLIN, GERMANY, A CORPORATION OF GERMANY

METHOD OF AND MEANS FOR ELIMINATING APERIODIC DISTURBANCES

Application filed October 18, 1928, Serial No. 313,202, and in Germany October 24, 1927.

It is known from the prior art that aperiodic disturbances in radio reception may be suppressed by combining the signal oscillations proper which are additionally modulated by the aperiodic stray, with the pure stray impulses separately received upon a neighboring wave-length so that the stray or disturbing impulses present in both branches are caused to neutralize each other, with the result that only the signal impulses present in one of the receiving circuits will be audible. However, in this manner the disturbing actions contrary to all expectations, and in spite of accurate equalization of the disturbing impulses in the compensator receiving circuit as to amplitude and exact phase adjustment or phase rotation through an angle of 180 degrees, are not perfectly neutralizable.

The object of the present invention, complete elimination or suppression of the disturbing impulses, is attained by also receiving in the compensating branch of the receiver circuits a radio frequency oscillation, though only influenced by disturbing impulses, and that the same in phase-opposition is fed to or superposed on the impulses flowing in the signal receiving branch or circuit, for the purpose of compensating of the stray disturbing currents.

In the method known in the prior art, the pure disturbing impulses received in the compensator or neutralizer branch, after demodulation, differ as to the form of the oscillations compared with the disturbing oscillations received with a carrier wave in the signal receiver circuit, so that no perfect compensation is feasible. In the novel method here disclosed, however, the disturbing impulses in both branches are received with a carrier frequency or wave so that the conditions under which the oscillations of the branches are demodulated are the same, inasmuch as there are no longer any distinctive features between them.

The radio frequency unmodulated oscillations for the compensator receiving circuit may be produced in a remote transmitter specially provided for this purpose and such a transmitter will be sufficient for a great number of receiver sets.

However, the generation of this wave may be effected also in the direct neighborhood of the receiver, say, by an auxiliary set comprising a standard receiver tube connected to act as a generator, and whose wave may be fed to the compensator receiving circuit by the intermediary of any suitable coupling means.

Another feasible scheme is to furnish the compensator receiving circuit with such a separate tube connected to act generatively in a way customary in superhetrodyne sets, this tube, if desired, acting at the same time as an amplifier. In this instance, the tube would generate radio frequency oscillations which are modulated by the stray impulses picked up by an aerial conductor connected with its grid circuit. The auxiliary wave thus generated should, at all events, be close to the signal frequency proper.

In a set having a built-in generator tube, in order that the same optimum frequency differences may always be obtained, the tuning means of the generator tube and the tuning means connected above the same should be in mechanical coupling relationship with those of the signal receiving apparatus; in other words, the condensers thereof should be seated upon one and the same spindle. Transmission of motion to the condensers may be effected by tooth wheels or tooth disks of irregular radius whereby the difference in the frequency between the signal wave and the auxiliary wave is made automatically larger for the higher frequency ranges and smaller for the lower frequency ranges.

One basic diagram of connections is illustrated by way of example in the accompanying drawing.

In the drawing there are shown two receiving circuit branches $E_1$ and $E_2$. The antenna $C_1$ of branch $E_1$ is in variable coupling relationship with the oscillations circuit $a_1$. The oscillation (tuned) circuit $a_1$ in the usual manner is associated with the grid and the filament of the radio frequency amplifier tube $b_1$ whose plate is connected by lead $d_1$ with the plate battery $e$ jointly provided for all of the tubes comprised in the outfit. A coupling means $f_1$ serves to transfer the amplified oscillations to the audion tube $g_1$. In the plate circuit of this tube is a coupling resistance $S_1$, to the regulable tap of which is connected lead $h_1$ brought to the compensator transformer T.

The receiver $E_1$ as above described is tuned to the signal-modulated wave to be received, and it receives also such aperiodic disturbances as may arise.

In the receiver circuit branch $E_2$ there is provided a receiver being identical to the one hereinbefore described and denoted by $C_2$, $a_2$, $b_2$, $f_2$, $g_2$. In order to supply to this receiving circuit an unmodulated auxiliary wave, there is provided a generator tube $i$ being hereby by way of example connected in the well-known "three-point" scheme. The plate circuit coil $k$ of this tube is coupled with the inductance coil $l$ of oscillations circuit $a_2$ so that the ensuing oscillations will reach the receiver. The generator tube and the oscillation circuits of receiver $E_2$ are tuned to the same wave-length differing but slightly from the signal wave.

In the compensator circuit $E_2$ therefore, only the aperiodic disturbances and the auxiliary wave will be received. The rectified impulses obtained at the terminal tube $g_1$ and $g_2$, respectively, are fed to the transformer T in such a way that the disturbing impulses existent in both circuit branches will neutralize each other, while only the signal impulses existing in branch $E_1$ are fed to the amplifier tube $m$ by way of the secondary coil of the transformer, being thereupon rendered perceptible by any desired means. In lieu of the amplifier tube $m$ also an indicator such as a telephone receiver may be directly connected with the secondary coil of the transformer.

As already indicated the auxiliary wave may be radiated at the transmitting end. In such a case, at the receiving end the oscillator $i$, $k$, would be omitted. Circuit $a_2$ would be tuned to the frequency of the auxiliary wave unmodulated except for the undesired disturbances. The auxiliary wave would be the same or preferably differ from the signal carrier wave, the difference being preferably, a superaudible frequency.

Having thus described my invention what I claim is:—

A wireless receiving system comprising two circuits one thereof being adapted to be tuned throughout a certain frequency range to the signal frequency desired to be received, the other thereof being adapted to be maintained slightly detuned a certain amount therefrom, a local oscillator adapted to generate oscillations of a frequency equal to the frequency at which said slightly detuned circuit is tuned coupled to said detuned circuit, means for simultaneously tuning both said circuits and said local oscillator to their respective frequencies, separate detecting means in each of said circuits and a common utilizing circuit differentially, resistively and variably coupled to both said detecting means.

In testimony whereof I affix my signature.

FRIEDRICH CONRAD.